(12) United States Patent
Tomari et al.

(10) Patent No.: US 9,477,169 B1
(45) Date of Patent: Oct. 25, 2016

(54) ELASTIC MEMBER, PROCESS CARTRIDGE, AND IMAGE-FORMING APPARATUS

(71) Applicant: FUJI XEROX CO., LTD., Tokyo (JP)

(72) Inventors: Shogo Tomari, Kanagawa (JP); Takuro Hoshio, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/047,736

(22) Filed: Feb. 19, 2016

(30) Foreign Application Priority Data

Sep. 3, 2015 (JP) .................................. 2015-174192

(51) Int. Cl.
*G03G 21/16* (2006.01)
*G03G 15/02* (2006.01)
*C08L 71/03* (2006.01)

(52) U.S. Cl.
CPC ........... *G03G 15/0233* (2013.01); *C08L 71/03* (2013.01); *C08L 2205/06* (2013.01)

(58) Field of Classification Search
USPC ........ 399/107, 110, 111, 115, 168, 174, 176, 399/279, 286; 428/413; 492/18; 524/403, 524/425, 500
See application file for complete search history.

(56) References Cited

U.S. PATENT DOCUMENTS

| | | | |
|---|---|---|---|
| 9,014,590 B2* | 4/2015 | Nishimura et al. | ........... G03G 15/0225 399/100 |
| 2010/0266941 A1 | 10/2010 | Minagoshi | |
| 2011/0319240 A1* | 12/2011 | Tomari | ................... C08L 71/03 492/18 |

FOREIGN PATENT DOCUMENTS

JP 2010-256426 A 11/2010

* cited by examiner

*Primary Examiner* — Hoan Tran
(74) *Attorney, Agent, or Firm* — Sughrue Mion, PLLC

(57) ABSTRACT

An elastic member includes a support and an elastic layer on the support. The elastic layer contains a rubber material and a softener having a number average molecular weight Mn of about 600 to about 1,000 and a ratio (Mw/Mn) of weight average molecular weight Mw to number average molecular weight Mn of about 2.5 or less.

8 Claims, 5 Drawing Sheets

ELASTIC MEMBER, PROCESS CARTRIDGE, AND IMAGE-FORMING APPARATUS

CROSS-REFERENCE TO RELATED APPLICATIONS

This application is based on and claims priority under 35 USC 119 from Japanese Patent Application No. 2015-174192 filed Sep. 3, 2015.

BACKGROUND (i) Technical Field

The present invention relates to elastic members, process cartridges, and image-forming apparatuses.

(ii) Related Art

An electrophotographic image-forming apparatus charges the surface of an image carrier such as an inorganic or organic photoconductive photoreceptor with a charging device, forms an electrostatic latent image with laser light modulated with image signals, and develops the electrostatic latent image with charged toner to form a visible toner image. The image-forming apparatus then electrostatically transfers the toner image to a recording medium such as recording paper, either directly or via an intermediate transfer member, and fixes the toner image to the recording medium to form a reproduced image.

A suitable charging device for charging the surface of the image carrier is a conductive elastic member.

SUMMARY

According to an aspect of the invention, there is provided an elastic member including a support and an elastic layer on the support. The elastic layer contains a rubber material and a softener having a number average molecular weight Mn of about 600 to about 1,000 and a ratio (Mw/Mn) of weight average molecular weight Mw to number average molecular weight Mn of about 2.5 or less.

BRIEF DESCRIPTION OF THE DRAWINGS

Exemplary embodiments of the present invention will be described in detail based on the following figures, wherein.

DETAILED DESCRIPTION

Figure 1:
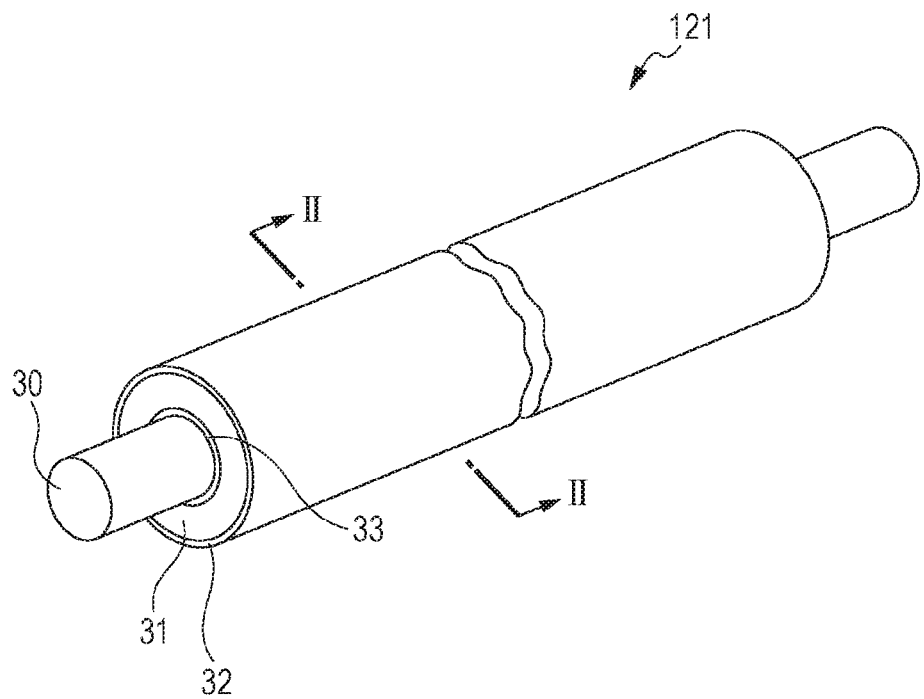
FIG. 1 is a schematic perspective view of an example elastic member according to an exemplary embodiment of the present invention.

Exemplary embodiments of the present invention will now be described in detail.
Elastic Member An elastic member according to an exemplary embodiment of the present invention includes a support and an elastic layer on the support. The elastic layer contains a rubber material and a softener having a number average molecular weight Mn of 600 to 1,000 or about 600 to about 1,000 and a ratio (Mw/Mn) of weight average molecular weight Mw to number average molecular weight Mn of 2.5 or less or about 2.5 or less.

The above composition of the elastic layer of the elastic member according to this exemplary embodiment may allow it to exhibit less decrease in tensile strength. A possible mechanism is as follows.

In the process of forming an elastic layer of an elastic member, the temperature of an unvulcanized rubber composition rises during compounding and vulcanizing steps. In the compounding step, the temperature of an unvulcanized rubber composition containing an unvulcanized rubber material and additives such as a softener (except the ingredients that undergo heat-induced chemical reactions, such as a vulcanizing agent and vulcanization accelerator) rises during compounding. For example, if a kneader is used in the compounding step, the temperature of the unvulcanized rubber composition discharged from the kneader rises to 140° C. or higher due to shear heat generation between the blade and the housing or pressure lid of the kneader. After the compounded unvulcanized rubber composition is molded in a machine such as a crosshead extruder, it is vulcanized by heating at 150° C. to 170° C. in the vulcanizing step.

An elastic layer formed from a rubber composition containing a softener having a molecular weight distribution with large proportions of low-molecular-weight components may exhibit unstable rubber properties since the low-molecular-weight components volatilize during the above two steps. In particular, the elastic layer may exhibit low tensile strength after vulcanization since the content of the softener, which imparts softness to the resulting elastic layer, varies.

A softener having a number average molecular weight Mn of 600 to 1,000 or about 600 to about 1,000 and a ratio (Mw/Mn) of weight average molecular weight Mw to number average molecular weight Mn of 2.5 or less or about 2.5 or less may have a molecular weight distribution with smaller proportions of low-molecular-weight components. The use of such a softener in the process of forming an elastic layer of an elastic member may result in less variation in the content of the softener in the rubber composition after the compounding and vulcanizing steps. The resulting elastic layer may thus exhibit less decrease in tensile strength.

As discussed above, the elastic layer of the elastic member according to this exemplary embodiment may exhibit less decrease in tensile strength. This elastic member may be used to provide various long-life members (e.g., charging members).

Since the use of a softener having a molecular weight distribution with smaller proportions of low-molecular-weight components in the process of forming an elastic layer of an elastic member may result in less variation in the content of the softener in the rubber composition after the compounding and vulcanizing steps, the resulting elastic layer may exhibit a smaller weight loss and may therefore have a higher dimensional stability. The use of such a softener may also result in less low-molecular-weight component precipitated on the surface of the elastic layer (i.e., bleeding) and less deterioration in the properties (e.g., hardness and tensile strength) of the elastic layer due to weight loss.

The elastic member according to this exemplary embodiment may be composed only of the support and the elastic layer or may further include, for example, an intermediate layer (adhesive layer) disposed between the elastic layer and the support, a surface layer disposed on the elastic layer, and an intermediate layer (e.g., a resistance-adjusting layer or migration-preventing layer) disposed between the elastic layer and the surface layer.

The elastic member according to this exemplary embodiment will now be described with reference to the drawings.

Figure 2:
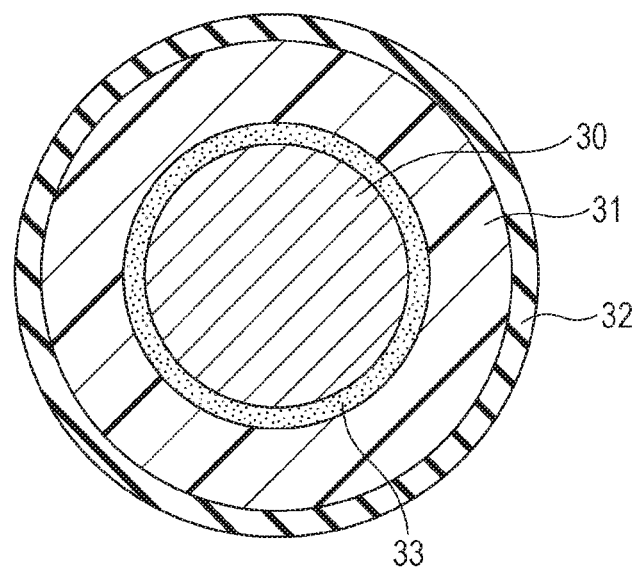
FIG. 2 is a schematic sectional view of the example elastic member according to the exemplary embodiment.

FIG. 1 is a schematic perspective view of an example elastic member according to this exemplary embodiment. FIG. 2 is a schematic sectional view, taken along line II-II, of the elastic member in FIG. 1.

As shown in FIGS. 1 and 2, an elastic member 121 according to this exemplary embodiment is a rubber roller including, for example, a support 30 (shaft), an adhesive layer 33 disposed on the outer surface of the support 30, an elastic layer 31 disposed on the outer surface of the adhesive layer 33, and a surface layer 32 disposed on the outer surface of the elastic layer 31. The adhesive layer 33 and the surface layer 32 are optional.

For example, if the elastic member 121 is used as a charging member (charging roller), the support 30 is a conductive support, and the elastic layer 31 is a conductive elastic layer containing a conductor. As used herein, the term "conductive" refers to having a volume resistivity of less than $1 \times 10^{14} \Omega$=at 20° C.

The components of the elastic member according to this exemplary embodiment will now be described in detail. The reference numerals are omitted in the following description.

Support

The support is a member (shaft) that functions to support the elastic member.

The support may be made of, for example, a metal such as iron (e.g., free-cutting steel), copper, brass, stainless steel, aluminum, or nickel. The support may also be a member (e.g., a resin or ceramic member) coated with a metal or a member (e.g., a resin or ceramic member) in which a conductor is dispersed.

The support may be either a hollow member (tubular member) or a solid member (pillar member).

Elastic Layer

The elastic layer contains a rubber material and a softener. The elastic layer may optionally contain other known additives. Specifically, the elastic layer is made of a vulcanizate of an unvulcanized rubber composition containing an unvulcanized rubber material, a softener, and optionally other known additives such as a conductor, vulcanizing agent, and vulcanization accelerator.

The term "rubber material" encompasses elastomers. Examples of unvulcanized rubbers include those that have at least carbon-carbon double bonds in the chemical structure thereof and that are crosslinkable by a vulcanization reaction to form a rubber material.

Examples of rubber materials include isoprene rubber, chloroprene rubber, epichlorohydrin rubber, butyl rubber, polyurethane rubber, silicone rubber, fluorocarbon rubber, styrene-butadiene rubber, butadiene rubber, nitrile rubber, ethylene-propylene rubber, epichlorohydrin-ethylene oxide copolymer rubber, epichlorohydrin-ethylene oxide copolymer rubber, epichlorohydrin-ethylene oxide-allyl glycidyl ether copolymer rubber, ethylene-propylene-diene terpolymer rubber (EPDM), acrylonitrile-butadiene copolymer rubber (NBR), natural rubber, and blends thereof.

Preferred among these are polyurethane rubber, EPDM, epichlorohydrin-ethylene oxide copolymer rubber, epichlorohydrin-ethylene oxide-allyl glycidyl ether copolymer rubber, NBR, and blends thereof, more preferably epichlorohydrin-ethylene oxide-allyl glycidyl ether copolymer rubber (ternary epichlorohydrin rubber made of a copolymer of epichlorohydrin, ethylene oxide, and allyl glycidyl ether).

These rubber materials may be used alone or in combination.

The rubber material may be either foamed or unfoamed. That is, the elastic layer may be either a foamed elastic layer or an unfoamed elastic layer.

The softener has a number average molecular weight Mn of 600 to 1,000 or about 600 to about 1,000 and a ratio of weight average molecular weight Mw to number average molecular weight Mn (Mw/Mn, hereinafter referred to as "molecular weight distribution") of 2.5 or less or about 2.5 or less.

The softener may have a number average molecular weight Mn of 700 to 900 or about 700 to about 900 to allow the elastic layer to exhibit less deterioration in properties such as tensile strength. The softener may have a molecular weight distribution (Mw/Mn) of 2.0 or less or about 2.0 or less to allow the elastic layer to exhibit less deterioration in properties such as tensile strength. The softener may have a molecular weight distribution (Mw/Mn) of 1.5 or more or about 1.5 or more for reasons such as manufacturing cost.

The number average molecular weight Mn and the weight average molecular weight Mw may be determined by gel permeation chromatography (GPC) using a molecular weight calibration curve created from monodisperse polystyrene standards. The measurement conditions are as follows: the GPC system is an HLC-8120GPC system equipped with an SC-8020 system controller (available from Tosoh Corporation), the columns are two TSKgel SuperHM-H columns (6.0 mm ID×15 cm, available from Tosoh Corporation), and the eluent is tetrahydrofuran (THF). The experiment is performed under the following conditions: the sample concentration is 0.5%, the flow rate is 0.6 mL/min., the sample injection volume is 10 μL, the measurement temperature is 40° C., and the detector is a refractive index (RI) detector. The calibration curve is created from the following ten samples: TSK A-500, F-1, F-10, F-80, F-380, A-2500, F-4, F-40, F-128, and F-700 polystyrene standards (available from Tosoh Corporation).

Examples of softeners include mineral oil softeners (e.g., paraffins, naphthenes, aromatic hydrocarbons, and oxides thereof), vegetable oil softeners, and fatty acid and fatty acid salt softeners.

Among these softeners, paraffins that are liquid at 25° C. or about 25° C. (particularly, oxidized liquid paraffins) may be used to allow the elastic layer to exhibit less deterioration in properties such as tensile strength. The number average molecular weight and molecular weight distribution of the softener may be controlled to the above ranges by purification or heating.

For example, an oxidized liquid paraffin (oxide of liquid paraffin) having a number average molecular weight and a molecular weight distribution within the above ranges is readily obtained by oxidizing a liquid paraffin by heat treatment at 130° C. to 190° C. for 1 to 5 hours.

The softener is preferably present in an amount of 0.1 to 20 parts by weight, more preferably 1 to 15 parts by weight, per 100 parts by weight of the rubber material to allow the elastic layer to exhibit less deterioration in properties such as tensile strength.

Examples of conductors include electronic conductors and ionic conductors.

Examples of electronic conductors include powders of the following conductors: carbon blacks such as Ketjenblack and acetylene black; other carbonaceous materials such as pyrolytic carbon and graphite; various conductive metals and alloys such as aluminum, copper, nickel, and stainless steel; various conductive metal oxides such as tin oxide, indium oxide, titanium oxide, tin oxide-antimony oxide solid solution, and tin oxide-indium oxide solid solution; and insulating materials treated to have a conductive surface.

Examples of ionic conductors include perchlorates and chlorates of tetraethylammonium and lauryltrimethylammonium and perchlorates and chlorates of alkali metals such as lithium and alkaline earth metals such as magnesium.

These conductors may be used alone or in combination.

Examples of carbon blacks include Special Black 350, Special Black 100, Special Black 250, Special Black 5, Special Black 4, Special Black 4A, Special Black 550, Special Black 6, Color Black FW200, Color Black FW2, and Color Black FW2V available from Orion Engineered Carbons and Monarch 1000, Monarch 1300, Monarch 1400, Mogul L, and Regal 400R available from Cabot Corporation.

The conductor may have an average particle size of 1 to 200 nm.

The average particle size may be determined as the average of the diameters (maximum diameters) of 100 conductor particles present in a sample cut from the elastic layer as measured under an electron microscope.

If the conductor is an electronic conductor, it is preferably, but not necessarily, added in an amount of 1 to 30 parts by weight, more preferably 15 to 25 parts by weight, per 100 parts by weight of the rubber material. If the conductor is an ionic conductor, it is preferably, but not necessarily, added in an amount of 0.1 to 5.0 parts by weight, more preferably 0.5 to 3.0 parts by weight, per 100 parts by weight of the rubber material.

Examples of additives other than conductors include known additives such as plasticizers, vulcanizing agents, vulcanization accelerators, antioxidants, surfactants, and coupling agents.

For example, if the elastic layer is also used as a resistance-adjusting layer, it preferably has a volume resistivity of from $10^3$ to less than $10^{14}$ Ωcm, more preferably from $10^5$ to $10^{12}$ Ωcm, even more preferably from $10^7$ to $10^{12}$ Ωcm.

The volume resistivity of the elastic layer may be determined as follows.

A sheet-shaped test sample is cut from the elastic layer. A voltage is applied to the test sample for 30 seconds according to JIS K 6911 (1995) using a test jig (R12702A/B resistivity chamber available from Advantest Corporation) and an ultrahigh resistance meter (R8340A digital ultrahigh resistance/microcurrent meter available from Advantest Corporation). The voltage is adjusted to maintain an electric field (applied voltage/thickness of composition sheet) of 1,000 V/cm. The volume resistivity is calculated from the current flowing by the following equation:

$$\text{Volume resistivity}(\Omega cm) = (19.63 \times \text{applied voltage}(V)) / (\text{current}(A) \times \text{thickness of test sample}(cm))$$

Although the thickness of the elastic layer varies depending on the apparatus used with the elastic member, it preferably has a thickness of, for example, 1 to 10 mm, more preferably 2 to 5 mm.

The thickness of the elastic layer may be determined as follows.

Three samples are cut from the center and the positions 20 mm from both ends of the elastic layer in the axial direction with a single-edged knife. The cross-sectional surfaces of the resulting samples are observed at an appropriate magnification selected within the range from 5× to 50× depending on the thickness. The thicknesses of the samples are measured and averaged. The measurement system is a VHX-200 digital microscope available from Keyence Corporation.

Adhesive Layer

The adhesive layer is formed, for example, from a composition containing an adhesive (resin or rubber). In addition to the adhesive, the composition may optionally contain other additives such as conductors.

Examples of resins include polyurethane resins, acrylic resins (e.g., polymethyl methacrylate resins and polybutyl methacrylate resins), polyvinyl butyral resins, polyvinyl acetal resins, polyarylate resins, polycarbonate (PC) resins, polyester resins, phenoxy resins, polyvinyl acetate resins, polyamide resins, polyvinylpyridine resins, and cellulose resins.

Other examples of resins include butadiene (RB) resins, polystyrene resins (e.g., styrene-butadiene-styrene elastomer (SBS)), polyolefin resins, polyester resins, polyurethane resins, polyethylene (PE) resins, polypropylene (PP) resins, polyvinyl chloride (PVC) resins, acrylic resins, styrene-vinyl acetate copolymer resins, butadiene-acrylonitrile copolymer resins, ethylene-vinyl acetate copolymer resins, ethylene-ethyl acrylate copolymer resins, ethylene-methacrylic acid (EMAA) copolymer resins, and modified derivatives thereof.

Examples of rubbers include EPDM, polybutadiene, natural rubber, polyisoprene, SBR, chloroprene rubber (CR), NBR, silicone rubber, urethane rubber, and epichlorohydrin rubber.

Preferred among these resins and rubbers are CR, epichlorohydrin rubber, chlorosulfonated polyethylene, and chlorinated polyethylene.

Examples of conductors include powders of the following conductors: carbon blacks such as Ketjenblack and acetylene black; other carbonaceous materials such as pyrolytic carbon and graphite; various conductive metals and alloys such as aluminum, copper, nickel, and stainless steel; various conductive metal oxides such as tin oxide, indium oxide, titanium oxide, tin oxide-antimony oxide solid solution, and tin oxide-indium oxide solid solution; and insulating materials treated to have a conductive surface.

The conductor preferably has an average particle size of 0.01 to 5 μm, more preferably 0.01 to 3 μm, even more preferably 0.01 to 2 μm.

The average particle size may be determined as the average of the diameters (maximum diameters) of 100 conductor particles present in a sample cut from the adhesive layer as measured under an electron microscope.

The conductor is preferably present in an amount of 0.1 to 6 parts by weight, more preferably 0.5 to 6 parts by weight, even more preferably 1 to 3 parts by weight, per total 100 parts by weight of the adhesive layer.

Examples of additives other than conductors include crosslinking agents, curing accelerators, inorganic fillers, organic fillers, flame retardants, antistatic agents, conductivity-imparting agents, lubricants, slidability-imparting agents, surfactants, colorants, and acid acceptors. The adhesive layer may contain two or more of these additives.

Surface Layer

The surface layer may be formed as a separate layer of a material such as resin on the elastic layer or may be formed by impregnating a surface portion of a foamed elastic layer with a material such as resin (i.e., the surface layer may be a surface portion of the elastic layer impregnated with a material such as resin).

Examples of materials for the surface layer include resins.

Examples of resins include acrylic resins, fluorine-modified acrylic resins, silicone-modified acrylic resins, cellulose resins, polyamide resins, nylon copolymers, polyurethane resins, PC resins, polyester resins, polyimide resins, epoxy resins, silicone resins, polyvinyl alcohol resins, polyvinyl butyral resins, polyvinyl acetal resins, ethylene-tetrafluoroethylene (ETFE) resins, melamine resins, polyethylene resins, polyvinyl resins, polyarylate resins, polythiophene resins, polyethylene terephthalate (PET) resins, and fluorocarbon resins (e.g., polyvinylidene fluoride (PVDF) resins, tetrafluoroethylene resins, tetrafluoroethylene-perfluoroalkyl vinyl ether copolymers (PFA), and tetrafluoroethylene-hexafluoropropylene copolymers (FEP)). These resins may be cured or crosslinked with curing agents or catalysts.

The nylon copolymers contain polymer units of one or more of nylon 610, nylon 11, and nylon 12. The nylon copolymers may contain other polymer units such as nylon 6 and nylon 66.

Among these resins, PVDF resins, tetrafluoroethylene resins, and polyamide resins are preferred for their anti-soiling properties, and polyamide resins are more preferred for improving the wear resistance of the surface layer and for preventing porous resin particles from coming off.

Among polyamide resins, alkoxymethylated polyamides (alkoxymethylated nylons) are preferred for improving the wear resistance of the surface layer, and methoxymethylated polyamides (N-methoxymethylated nylons) are more preferred.

The resin may be crosslinked to improve the mechanical strength of the surface layer and prevent the surface layer from cracking.

Examples of other materials for the surface layer include known additives that are generally added to surface layers, such as conductors, fillers, curing agents, vulcanizing agents, vulcanization accelerators, antioxidants, surfactants, and coupling agents.

The surface layer may have a thickness of, for example, 2 to 25 μm, preferably 3 to 20 μm, more preferably 3 to 15 μm, even more preferably 5 to 15 μm.

The thickness of the surface layer may be determined as follows. Three samples are cut from the center and the positions 20 mm from both ends of the surface layer (elastic member) in the axial direction with a single-edged knife. The cross-sectional surfaces of the resulting samples are observed at 1,000× magnification. The thicknesses of the samples are measured and averaged. The measurement system is a VHX-200 digital microscope available from Keyence Corporation.

Method for Manufacturing Elastic Member

An example method for manufacturing the elastic member according to this exemplary embodiment will now be described.

The method for manufacturing the elastic member according to this exemplary embodiment includes, for example, the steps of forming a layer of a compounded unvulcanized rubber composition on a support (hereinafter also referred to as "first step") and vulcanizing the layer of the unvulcanized rubber composition to form an elastic layer made of a vulcanizate of the unvulcanized rubber composition on the support (hereinafter also referred to as "second step").

The individual steps will now be described in detail.

First Step

In the first step, a layer of an unvulcanized rubber composition (hereinafter also referred to as "rubber composition") is formed on a support (hereinafter also referred to as "core"). Specifically, a cylindrical layer of the rubber composition (hereinafter also referred to as "rubber roller part") is formed on the outer surface of the core, for example, using an extruder 210 shown in FIG. 3.

Extruder

Figure 3:
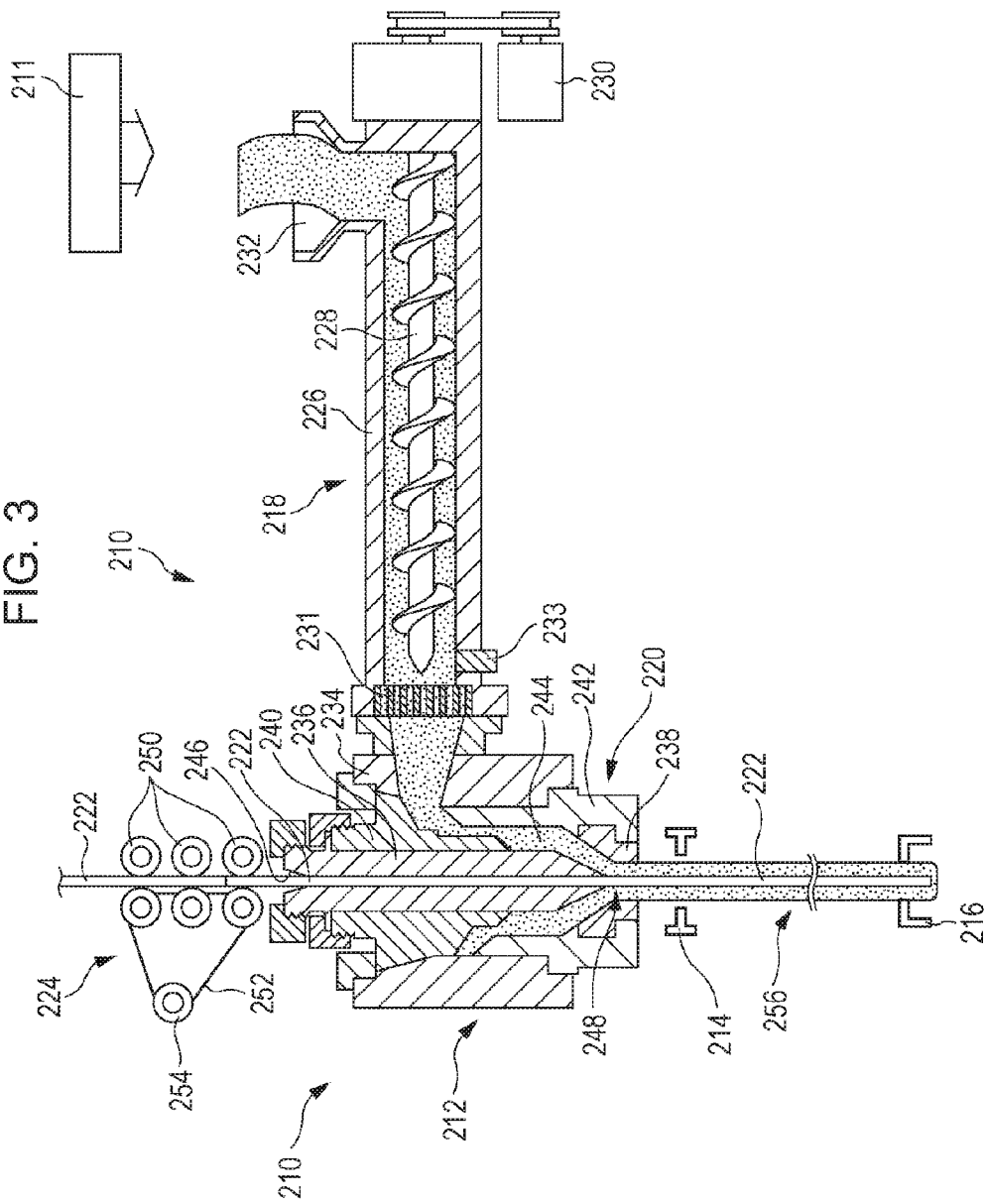
FIG. 3 is a schematic view of an example crosshead extruder.

The extruder 210 shown in FIG. 3 includes a discharge device 212 including a crosshead die, a pressing device 214 disposed downstream of the discharge device 212, and a drawing device 216 disposed downstream of the pressing device 214.

The extruder 210 also includes a controller 211 that controls the individual units of the extruder 210.

The drawing device 216 includes a rubber supply unit 218 that supplies the rubber composition, an extrusion unit 220 that extrudes the rubber composition supplied from the rubber supply unit 218 into a cylindrical shape, and a core supply unit 224 that supplies a core 222 to the center of the cylindrical flow of the rubber composition extruded from the extrusion unit 220.

The rubber supply unit 218 includes a cylinder 226 and a screw 228 disposed therein. The screw 228 is rotated by a drive motor 230. A hopper 232 for supplying the rubber composition is disposed at the end of the cylinder 226 adjacent to the drive motor 230. A breaker plate 231 is disposed at the rubber composition outlet of the cylinder 226. The rubber composition supplied from the hopper 232 is fed through the breaker plate 231 into the extrusion unit 220 while being kneaded by the screw 228 in the cylinder 226.

The extrusion unit 220 includes a cylindrical case 234 joined to the rubber supply unit 218, a cylindrical mandrel 236 disposed in the center of the case 234, and a discharge head 238 disposed below the mandrel 236. The mandrel 236 is secured to the case 234 with a securing member 240. The discharge head 238 is secured to the case 234 with a securing member 242. An annular passage 244 through which the rubber composition flows annularly is defined between the outer surface of the mandrel 236 (and the outer surface of the securing member 240) and the inner surface of the securing member 242 (and the inner surface of the discharge head 238).

The mandrel 236 has an insertion hole 246 for the insertion of the core 222 in the center thereof. The bottom of the mandrel 236 is tapered toward the end thereof. The core 222 supplied from the insertion hole 246 merges with the rubber composition supplied from the annular passage 244 in a merging area 248 located below the end of the mandrel 236. Thus, while the rubber composition is extruded into a cylindrical shape toward the merging area 248, the core 222 is fed into the center of the cylindrical flow of the rubber composition.

The core supply unit 224 includes multiple (three) pairs of rollers 250 disposed above the mandrel 236. One of each pair of rollers 250 is linked to a drive roller 254 via a belt 252. As the drive roller 254 is driven, a core 222 held between the pairs of rollers 250 is fed into the insertion hole 246 of the mandrel 236. Multiple cores 222 of predetermined length are passed through the insertion hole 246 one after another such that a preceding core 222 located in the insertion hole 246 of the mandrel 236 is pushed forward by a following core 222 fed by the pairs of rollers 250. The drive roller 254 is temporarily stopped when the front end of the preceding core 222 reaches the end of the mandrel 236, and the core 222 is fed into the merging area 248 located below the mandrel 236 at a certain time interval.

In this way, the rubber composition is extruded into a cylindrical shape in the merging area 248 of the discharge device 212, and the cores 222 are fed into the center of the flow of the rubber composition one after another at certain time intervals. The outer surfaces of the cores 222 are thus covered with the rubber composition to form rubber roller parts 256 (cylindrical layers of the rubber composition) on the outer surfaces of the cores 222. The outer surfaces of the cores 222 may be coated in advance with an adhesive layer (i.e., a primer or adhesive) to improve the adhesion between the cores 222 and the rubber composition.

The controller 211 is configured to control the operation of the individual units of the extruder 210.

For example, the controller 211 is a computer (not shown) including a central processing unit (CPU), various types of memory (e.g., random-access memory (RAM), read-only memory (ROM), and nonvolatile memory), and an input/output (I/O) interface that are connected to each other via a bus. The I/O interface is connected to the units of the extruder 210, such as the drive motor 230 that rotates the screw 228, the drive motor (not shown) that rotates the drive roller 254, and a pressure gauge 233.

The CPU controls the operation of the individual units of the extruder 210, for example, by executing a program (e.g., a control program such as an extrusion program) stored in the memory. The program to be executed by the CPU need not necessarily be stored in the memory, but may instead be stored in other storage media such as flexible disks, DVDs, magneto-optical disks, and USB (universal serial bus) memory (not shown). Alternatively, the program may be stored in a storage device in another system connected to a communication unit (not shown).

Second Step

In the second step, the layer of the rubber composition (unvulcanized rubber composition) is vulcanized to form an elastic layer made of a vulcanizate of the unvulcanized rubber composition on the core (support).

Specifically, the layer of the rubber composition (unvulcanized rubber composition) is heated to the vulcanization temperature of the unvulcanized rubber material. The layer of the rubber composition may be heated, for example, in an oven (e.g., a hot-air oven). For example, the rubber roller, which includes the layer of the rubber composition formed on the outer surface of the core (support), is heated at 150° C. to 200° C. for 10 to 120 minutes. In this way, the unvulcanized rubber material present in the layer of the rubber composition is vulcanized to form an elastic layer.

A surface layer is then optionally formed on the surface of the elastic layer of the resulting rubber roller.

The above steps provide the elastic member according to this exemplary embodiment.

Charging Device

A charging device according to an exemplary embodiment of the present invention will now be described.

Figure 4:
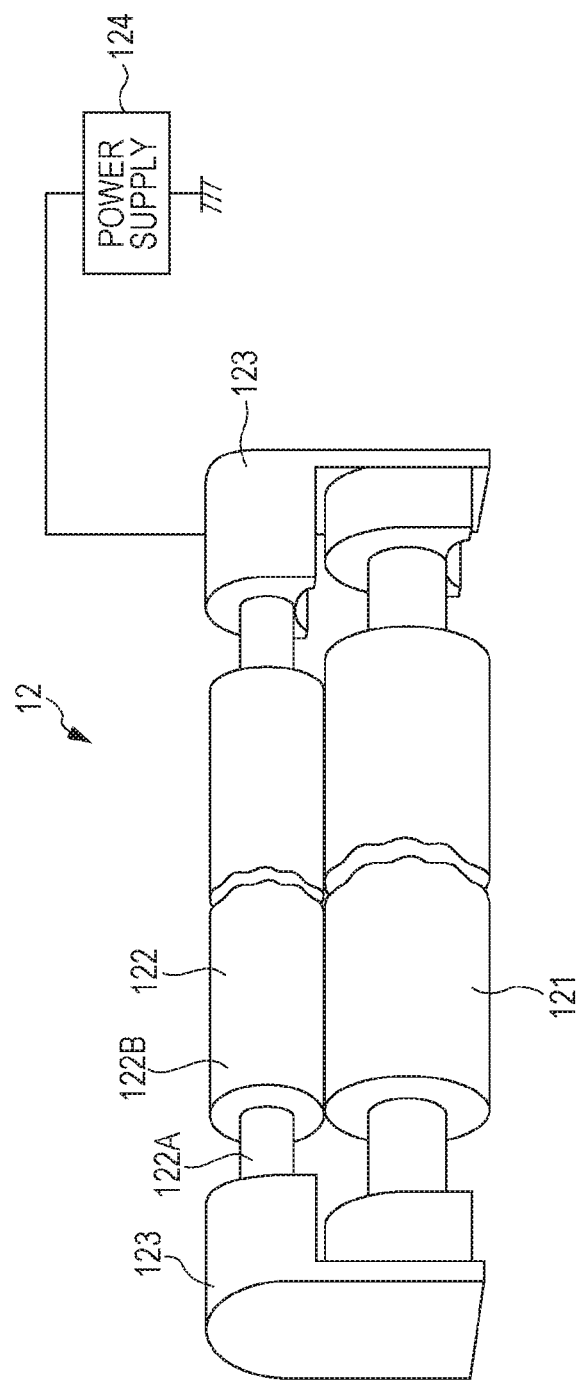
FIG. 4 is a schematic view of an example charging device according to an exemplary embodiment of the present invention.

FIG. 4 is a schematic view of an example charging device according to this exemplary embodiment.

The charging device according to this exemplary embodiment includes, as a charging member, the elastic member according to the foregoing exemplary embodiment (specifically, a conductive member including a conductive support and a conductive elastic layer).

For example, as shown in FIG. 4, a charging device 12 according to this exemplary embodiment includes a charging member 121 and a cleaning member 122 that are disposed in contact with each other at a certain amount of depression. A pair of conductive bearings 123 rotatably support the conductive support of the charging member 121 and a conductive support 122A of the cleaning member 122 at both ends in the axial direction. One of the conductive bearings 123 is connected to a power supply 124.

The charging device according to this exemplary embodiment may have other configurations; for example, the cleaning member 122 may be omitted.

The cleaning member 122, such as a cleaning roller, cleans the surface of the charging member 121. The cleaning member 122 includes, for example, a cylindrical conductive support 122A and an elastic layer 122B disposed on the outer surface of the conductive support 122A.

The conductive support 122A is a conductive rod-shaped member made of, for example, a metal such as iron (e.g., free-cutting steel), copper, brass, stainless steel, aluminum, or nickel. The conductive support 122A may also be a member (e.g., a resin or ceramic member) coated with a metal or a member (e.g., a resin or ceramic member) in which a conductor is dispersed. The conductive support 122A may be either a hollow member (tubular member) or a solid member.

The elastic member 122B may be made of a foam having a three-dimensional porous structure with inner cavities and surface irregularities (hereinafter referred to as "cells"). The elastic member 122B may be made of various foamable resin and rubber materials such as polyurethanes, polyethylene, polyamides, polyolefins, melamine resins, polypropylene, NBR, EPDM, natural rubber, styrene-butadiene rubber, chloroprene, silicone rubber, and nitrile rubber.

Among these foamable resin and rubber materials, polyurethanes, which have high tear strength and tensile strength, may be used to facilitate the removal of foreign matter, such as toner and external additive, from the charging member 121 by the friction of the cleaning member 122, to reduce scratches formed on the surface of the charging device 121 by the friction of the cleaning member 122, and to improve the tear and fracture resistance of the elastic member 122B over an extended period of time.

Examples of polyurethanes include, but not limited to, reaction products of polyols (e.g., polyester polyols, polyether polyols, and acrylic polyols) with isocyanates (e.g., 2,4-tolylene diisocyanate, 2,6-tolylene diisocyanate, 4,4-diphenylmethane diisocyanate, tolidine diisocyanate, and 1,6-hexamethylene diisocyanate) and reaction products thereof with chain extenders (e.g., 1,4-butanediol and trimethylolpropane). Polyurethanes are typically foamed with blowing agents (e.g., water and azo compounds such as azodicarbonamide and azobisisobutyronitrile).

The elastic member 122B preferably contains 20 to 80 cells per 25 mm, 30 to 80 cells per 25 mm, even more preferably 30 to 50 cells per 25 mm.

The elastic layer 122B preferably has a hardness of 100 to 500 N, more preferably 100 to 400 N, even more preferably 150 to 400 N.

The conductive bearings 123 support the charging member 121 and the cleaning member 122 such that they are rotatable together and maintain a predetermined shaft-to-shaft distance therebetween. The conductive bearings 123 may be formed in any manner using any conductive material. For example, the conductive bearings 123 may be conductive plain bearings.

The power supply 124 applies a voltage across the conductive bearings 123 to charge the charging member 121 and the cleaning member 122 to the same polarity. The power supply 124 may be a known high-voltage power supply.

For example, as the power supply 124 applies a voltage across the conductive bearings 123 of the charging device 12 according to this exemplary embodiment, the charging member 121 and the cleaning member 122 are charged to the same polarity.

Image-Forming Apparatus

An image-forming apparatus according to an exemplary embodiment of the present invention will now be described.

The image-forming apparatus according to this exemplary embodiment includes an electrophotographic photoreceptor having a surface; a charging unit including the elastic member according to the foregoing exemplary embodiment (specifically, a conductive member including a conductive support and a conductive elastic layer) as a charging member that is disposed in contact with the surface of the electrophotographic photoreceptor and that charges the electrophotographic photoreceptor; an electrostatic-latent-image forming unit that forms an electrostatic latent image on the surface of the charged electrophotographic photoreceptor; a developing unit that develops the electrostatic latent image formed on the surface of the electrophotographic photoreceptor with a developer containing a toner to form a toner image; and a transfer unit that transfers the toner image to a surface of a recording medium.

Figure 5:
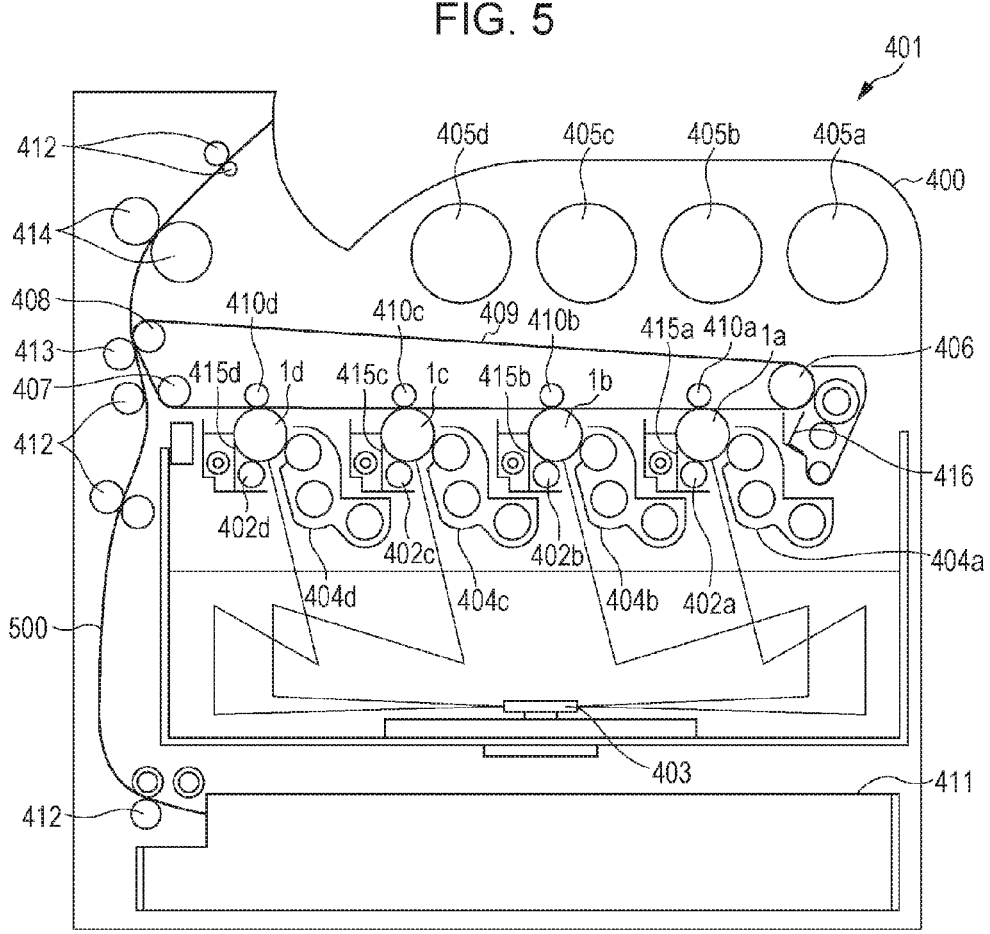
FIG. 5 is a schematic view of an example image-forming apparatus according to an exemplary embodiment of the present invention.

FIG. 5 schematically shows an example basic structure of the image-forming apparatus according to this exemplary embodiment. An image-forming apparatus 401 shown in FIG. 5 is an intermediate-transfer image-forming apparatus including four electrophotographic photoreceptors 1a, 1b, 1c, and 1d arranged parallel to each other along an intermediate transfer belt 409 in a housing 400. For example, the electrophotographic photoreceptors 1a, 1b, 1c, and 1d form yellow, magenta, cyan, and black images, respectively.

The electrophotographic photoreceptors 1a, 1b, 1c, and 1d installed in the image-forming apparatus 401 are electrophotographic photoreceptors according to this exemplary embodiment.

The electrophotographic photoreceptors 1a, 1b, 1c, and 1d rotate in one direction (counterclockwise in FIG. 5). The image-forming apparatus 401 further includes, in order in the rotational direction of the electrophotographic photoreceptors 1a, 1b, 1c, and 1d, charging rollers 402a, 402b, 402c, and 402d, developing devices 404a, 404b, 404c, and 404d, first transfer rollers 410a, 410b, 410c, and 410d, and cleaning blades 415a, 415b, 415c, and 415d. The charging rollers 402a, 402b, 402c, and 402d are contact charging rollers according to the foregoing exemplary embodiment.

The developing devices 404a, 404b, 404c, and 404d supply yellow, magenta, cyan, and black toners, respectively, from toner cartridges 405a, 405b, 405c, and 405d. The first transfer rollers 410a, 410b, 410c, and 410d are disposed opposite the electrophotographic photoreceptors 1a, 1b, 1c, and 1d, respectively, with the intermediate transfer belt 409 therebetween.

A laser light source (exposure device) 403 is disposed in the housing 400. The surfaces of the charged electrophotographic photoreceptors 1a, 1b, 1c, and 1d are irradiated with laser light emitted from the laser light source 403.

The charging, exposure, developing, first transfer, and cleaning (removal of foreign matter such as toner) steps are sequentially performed during the rotation of the electrophotographic photoreceptors 1a, 1b, 1c, and 1d to transfer toner images of different colors to the intermediate transfer belt 409 such that they are superimposed on top of each other. After the toner images are transferred to the intermediate transfer belt 409, the electrophotographic photoreceptors 1a, 1b, 1c, and 1d are subjected to the next image-forming process without the step of removing surface charge.

The intermediate transfer belt 409 is tensioned around a drive roller 406, a back roller 408, and a support roller 407 and is rotated without slack by the rotation of these rollers 406, 408, and 407. A second transfer roller 413 is disposed opposite the back roller 408 with the intermediate transfer belt 409 therebetween. After passing through the nip between the back roller 408 and the second transfer roller 413, the intermediate transfer belt 409 is cleaned, for example, by a cleaning blade 416 disposed opposite the drive roller 406 and is then subjected to the next image-forming process.

A container 411 containing recording media 500, such as sheets of paper, is disposed in the housing 400. A recording medium 500 is transported by transport rollers 412 from the container 411 to the nip between the intermediate transfer belt 409 and the second transfer roller 413 and then to the nip between two fixing rollers 414 disposed opposite each other before being output from the housing 400.

Whereas the intermediate transfer member illustrated in the foregoing exemplary embodiment is the intermediate transfer belt 409, the intermediate transfer member may be either a belt, such as the intermediate transfer belt 409, or a drum. If the intermediate transfer member is a belt, the substrate for the intermediate transfer member may be made of a known resin. Examples of resins for the substrate include polyimides, PC, PVDF, polyalkylene terephthalates (PAT), ETFE/PC blends, ETFE/PAT blends, PC/PAT blends, polyesters, polyetheretherketones, polyamides, and materials based on these resin materials. These resin materials may be used in a blend with elastic materials.

The recording medium used in the foregoing exemplary embodiment may be any medium to which a toner image is transferred from an electrophotographic photoreceptor.

Process Cartridge

A process cartridge according to an exemplary embodiment of the present invention is attachable to and detachable from an image-forming apparatus and includes a charging unit including the charging member according to the foregoing exemplary embodiment. The charging member is disposed in contact with a surface of an electrophotographic photoreceptor and charges the electrophotographic photoreceptor.

Figure 6:
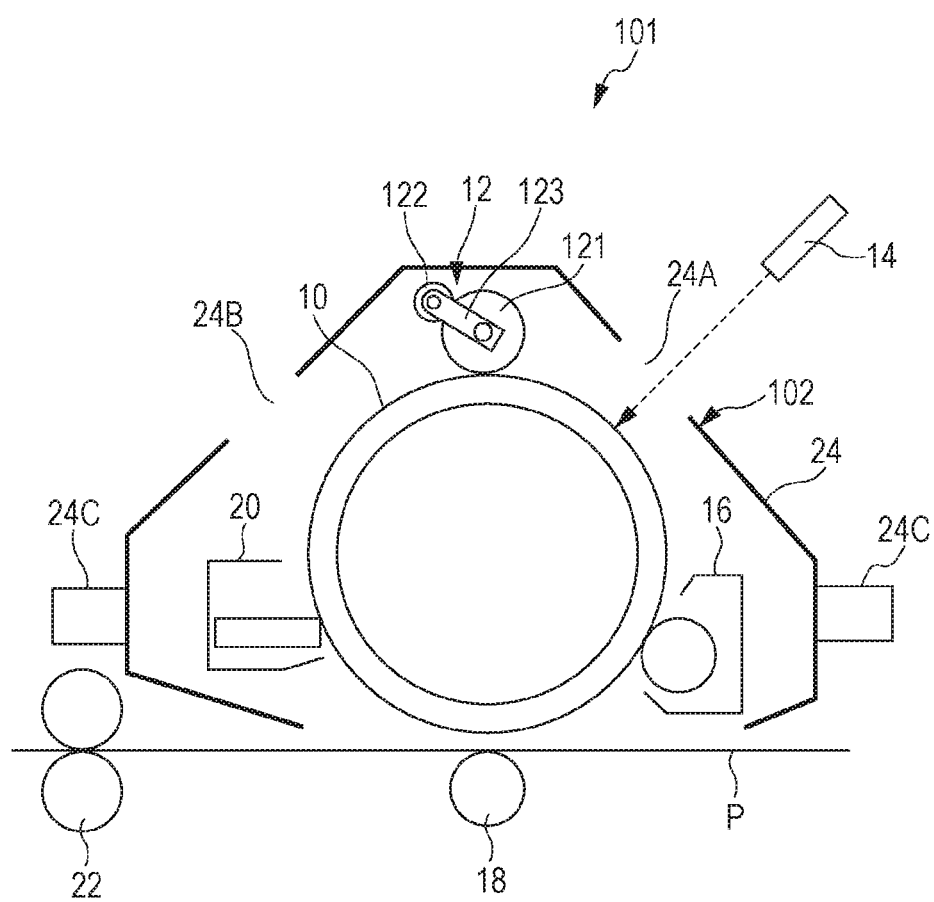
FIG. 6 is a schematic view of an example process cartridge according to an exemplary embodiment of the present invention.

FIG. 6 schematically shows an example basic structure of the process cartridge according to this exemplary embodiment. As shown in FIG. 6, a process cartridge 102 according to this exemplary embodiment includes an electrophotographic photoreceptor 10, a charging device 12 including the elastic member according to the foregoing exemplary embodiment as a charging member 121 that is disposed in contact with the surface of the electrophotographic photoreceptor 10 and that charges the electrophotographic photoreceptor 10; a developing device 16 that develops a latent image formed by an exposure device 14 with a toner to form a toner image; and a cleaning device 20 that removes residual toner from the surface of the electrophotographic photoreceptor 10 after the transfer. The electrophotographic photoreceptor 10, the charging device 12, the developing device 16, and the cleaning device 20 are combined into a housing 24 having an opening 24A for exposure, an opening 24B for erase exposure, and mounting rails 24C. The process cartridge 102 is attachable to and detachable from an image-forming apparatus 101. The image-forming apparatus 101 according to this exemplary embodiment further includes a transfer device 18 that transfers a toner image to a recording medium P and a fixing device 22 that fixes the toner image to the recording medium P.

EXAMPLES

The present invention is further illustrated by the following examples, although these examples are not intended to limit the present invention. Parts are by weight unless otherwise specified.

Example 1

Fabrication of Rubber Roller

Preparation of Unvulcanized Rubber Composition

A liquid paraffin (DB02, Osaka Soda Co., Ltd.) is placed in an air oven at 170° C. for three hours. This heat treatment of the liquid paraffin yields an oxidized liquid paraffin (oxide of liquid paraffin) having a number average molecular weight of 754 and a molecular weight distribution (Mw/Mn) of 1.8. This oxidized liquid paraffin is used as a softener.

An unvulcanized rubber composition is prepared by compounding the following ingredients using a tangential pressure kneader (Moriyama Co., Ltd., actual capacity: 75 L). Specifically, the jacket, pressure lid, and rotor of the pressure kneader are maintained at 20° C. with circulating water, and the pressure lid is maintained at a pressure of 0.6 MPa. Following mastication, the unvulcanized rubber material is compounded with zinc oxide, is compounded with the softener (oxidized liquid paraffin), stearic acid, and carbon black, and is compounded with an ionic conductor and calcium carbonate to obtain an unvulcanized rubber composition. The resulting unvulcanized rubber composition is cut into a sheet using a twin-screw sheet-preforming machine (Moriyama Co., Ltd., actual capacity: 75 L) and is cooled to room temperature. The sheet of the unvulcanized rubber composition is then compounded with a crosslinking agent and vulcanization accelerators using the pressure kneader and is passed through a strainer using a gear pump extruder to obtain an unvulcanized rubber composition.

Composition of Unvulcanized Rubber Composition

Unvulcanized rubber material (epichlorohydrin-ethylene oxide-allyl glycidyl ether copolymer rubber, CG102, Osaka Soda Co., Ltd.) 100 parts by weight Zinc oxide (Zinc Oxide Type II, Seido Chemical Industry Co., Ltd.) 5 parts by weight Stearic acid (Stearic Acid S, Kao Corporation) 1 part by weight Carbon black (Ketjenblack EC, Lion Corporation) 15 parts by weight Softener (oxidized liquid paraffin) 10 parts by weight Calcium carbonate (Hakuenka CCR, Shiraishi Kogyo Kaisha, Ltd.) 20 parts by weight Ionic conductor (benzyltrimethylammonium chloride, BTMAC, Lion Specialty Chemicals Co., Ltd.) 1 part by weight Vulcanizing agent (Sulfur 200 Mesh, Tsurumi Chemical Co., Ltd.) 1 part by weight Vulcanization accelerator (Nocceler DM, Ouchi Shinko Chemical Industrial Co., Ltd.) 2.0 parts by weight Vulcanization accelerator (Nocceler TT, Ouchi Shinko Chemical Industrial Co., Ltd.) 0.5 part by weight Formation of Elastic Layer A stainless steel (5U5303) support having a diameter of 8 mm and a length of 330 mm and coated with an adhesive layer is provided. This support is covered with a layer of the unvulcanized rubber composition by extruding the unvulcanized rubber composition using a single-screw rubber extruder including a cylinder having an inner diameter of 60 mm and a length-to-diameter (L/D) ratio of 20 at a screw speed of 25 rpm while continuously passing the support through a crosshead die. The cylinder, screw, head, and die of the extruder are maintained at 80° C. The unvulcanized rubber roller including the support covered with the layer of the unvulcanized rubber composition is heated in an air oven at 170° C. for 70 minutes.

In this way, a rubber roller including a support on which an elastic layer is formed is fabricated.

Example 2

A rubber roller is fabricated as in Example 1 except that the liquid paraffin used as the softener in Example 1 is replaced with an oxidized liquid paraffin (oxide of liquid paraffin) prepared by heating the liquid paraffin for one hour and having a number average molecular weight of 689 and a molecular weight distribution (Mw/Mn) of 2.2.

Example 3

A rubber roller is fabricated as in Example 1 except that the liquid paraffin used as the softener in Example 1 is replaced with an oxidized liquid paraffin (oxide of liquid paraffin) prepared by heating the liquid paraffin for five hours and having a number average molecular weight of 854 and a molecular weight distribution (Mw/Mn) of 1.6.

Example 4

A rubber roller is fabricated as in Example 1 except that the liquid paraffin used as the softener in Example 1 is replaced with an oxidized aromatic hydrocarbon softener (oxide of aromatic hydrocarbon process oil (aromatic hydrocarbon softener)) prepared from an aromatic hydrocarbon softener (Diana Process Oil AH-16, Idemitsu Kosan Co., Ltd.) and having a number average molecular weight of 810 and a molecular weight distribution (Mw/Mn) of 2.1.

Comparative Example 1

A rubber roller is fabricated as in Example 1 except that the liquid paraffin used as the softener in Example 1 is replaced with an oxidized liquid paraffin (oxide of liquid paraffin) prepared by heating the liquid paraffin at 120° C. for five hours and having a number average molecular weight of 554 and a molecular weight distribution (Mw/Mn) of 2.9.

Comparative Example 2

A rubber roller is fabricated as in Example 1 except that the liquid paraffin used as the softener in Example 1 is replaced with an unheated liquid paraffin having a number average molecular weight of 556 and a molecular weight distribution (Mw/Mn) of 2.8.

Comparative Example 3

A rubber roller is fabricated as in Example 1 except that the liquid paraffin used as the softener in Example 1 is replaced with an oxidized liquid paraffin (oxide of liquid paraffin) prepared from a different liquid paraffin (Diana Process Oil PW-150, Idemitsu Kosan Co., Ltd.) and having a number average molecular weight of 350 and a molecular weight distribution (Mw/Mn) of 2.2.

Comparative Example 4

A rubber roller is fabricated as in Example 1 except that the liquid paraffin used as the softener in Example 1 is replaced with an oxidized liquid paraffin (oxide of liquid paraffin) prepared by heating a different liquid paraffin (Lubflex 460, Shell Japan) for 12 hours and having a number average molecular weight of 1,120 and a molecular weight distribution (Mw/Mn) of 2.0.

Comparative Example 5

A rubber roller is fabricated as in Example 1 except that the liquid paraffin used as the softener in Example 1 is replaced with an oxidized liquid paraffin (oxide of liquid paraffin) prepared from a different liquid paraffin (Diana Process Oil PS-430, Idemitsu Kosan Co., Ltd.) and having a number average molecular weight of 685 and a molecular weight distribution (Mw/Mn) of 2.9.

Evaluation

Weight Loss

The weights of the unvulcanized rubber rollers, which include a support covered with a layer of an unvulcanized rubber composition, and the weights of the vulcanized rubber rollers, which include a support on which an elastic layer is formed, are measured. The average weight loss of ten rubber rollers is calculated and is rated on the following scale:

A: weight loss of not more than 1.0%
B: weight loss of more than 1.0 but not more than 2.5%
C: weight loss of more than 2.5 but not more than 5.0%
D: weight loss of more than 5.0

Tensile Strength of Elastic Layer

A test specimen is taken from the elastic layer of each rubber roller and is cut with a dumbbell No. 3 die according to JIS K 6251 (2004). The test specimen is tested for tensile strength using a Strograph VE1D (Toyo Seiki Seisaku-sho, Ltd.).

Hardness of Elastic Layer

The surface hardness of the rubber rollers is measured with a MD-1 microdurometer (Polymer Type A, Kobunshi Keiki Co., Ltd.).

TABLE 1

| | Softener | | | Weight loss (%) | | Properties of elastic layer | |
|---|---|---|---|---|---|---|---|
| | Type | Mn | Mw/Mn | Value | Rating | Tensile strength (MPa) | Hardness (°) |
| Example 1 | Oxidized liquid paraffin | 754 | 1.8 | 0.67 | A | 6.21 | 35 |
| Example 2 | Oxidized liquid paraffin | 689 | 2.2 | 0.85 | A | 6.08 | 32 |
| Example 3 | Oxidized liquid paraffin | 854 | 1.6 | 0.35 | A | 6.52 | 37 |
| Example 4 | Oxidized aromatic hydrocarbon softener | 810 | 2.1 | 0.79 | A | 6.43 | 36 |
| Comparative Example 1 | Oxidized liquid paraffin | 554 | 2.9 | 6.21 | D | 3.78 | 25 |
| Comparative Example 2 | Paraffin softener (untreated) | 556 | 2.8 | 8.78 | D | 3.44 | 24 |
| Comparative Example 3 | Oxidized liquid paraffin | 350 | 2.2 | 7.56 | D | 2.89 | 19 |
| Comparative Example 4 | Oxidized liquid paraffin | 1,120 | 2.0 | 10.2 | D | 2.95 | 21 |
| Comparative Example 5 | Oxidized liquid paraffin | 685 | 2.9 | 8.23 | D | 3.12 | 23 |

The above results show that the rubber rollers of the Examples, which include an elastic layer containing a softener having a number average molecular weight and a molecular weight distribution (Mw/Mn) in particular ranges, exhibit smaller weight losses after the formation of the elastic layer than the rubber roller of Comparative Example 1. This indicates less variation in the content of the softener in the rubber composition.

The results also show that the elastic layers of the rubber rollers of the Examples have higher tensile strengths and hardnesses than the elastic layer of the rubber roller of Comparative Example 1. This indicates less deterioration in the properties (rubber properties) of the elastic layers of the rubber rollers of the Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An elastic member comprising:
a support; and
an elastic layer on the support, the elastic layer comprising a rubber material and a softener having a number average molecular weight Mn of about 600 to about 1,000 and a ratio (Mw/Mn) of weight average molecular weight Mw to number average molecular weight Mn of about 2.5 or less.

2. The elastic member according to claim 1, wherein the softener has a number average molecular weight Mn of about 700 to about 900 and a ratio (Mw/Mn) of weight average molecular weight Mw to number average molecular weight Mn of about 2.0 or less.

3. The elastic member according to claim 1, wherein the softener has a number average molecular weight Mn of about 700 to about 900 and a ratio (Mw/Mn) of weight average molecular weight Mw to number average molecular weight Mn of about 1.5 or more.

4. The elastic member according to claim 1, wherein the rubber material is a ternary epichlorohydrin rubber comprising a copolymer of epichlorohydrin, ethylene oxide, and allyl glycidyl ether.

5. The elastic member according to claim 1, wherein the softener is a paraffin that is liquid at about 25° C.

6. The elastic member according to claim 1, wherein the softener is an oxidized liquid paraffin.

7. A process cartridge attachable to and detachable from an image-forming apparatus, the process cartridge comprising a charging device including the elastic member according to claim 1 as a charging member that is disposed in contact with a surface of an electrophotographic photoreceptor and that charges the electrophotographic photoreceptor.

8. An image-forming apparatus comprising:
an electrophotographic photoreceptor having a surface;
a charging device including the elastic member according to claim 1 as a charging member that is disposed in contact with the surface of the electrophotographic photoreceptor and that charges the electrophotographic photoreceptor;
an electrostatic-latent-image forming device that forms an electrostatic latent image on the surface of the charged electrophotographic photoreceptor;
a developing device that develops the electrostatic latent image formed on the surface of the electrophotographic photoreceptor with a developer comprising a toner to form a toner image; and
a transfer device that transfers the toner image to a surface of a recording medium.

* * * * *